Nov. 28, 1961   R. R. FIKE ET AL   3,010,189
CARBON TO ALUMINUM BOND
Original Filed Feb. 8, 1956

Inventors:
Russell R. Fike and
Albert J. Pilous
By:
William S. McCurry Atty.

3,010,189
CARBON TO ALUMINUM BOND

Russell R. Fike, Euclid, and Albert J. Pilous, Cleveland, Ohio, assignors to Borg-Warner Corporation, Chicago, Ill., a corporation of Illinois
Original application Feb. 8, 1956, Ser. No. 564,200, now Patent No. 2,920,385, dated Jan. 12, 1960. Divided and this application Nov. 25, 1959, Ser. No. 858,304
2 Claims. (Cl. 29—195)

This application is a division of our copending application S.N. 564,200 filed February 8, 1956, now Patent 2,920,385.

This invention relates to a process of bonding materials of different characteristics and more particularly to a process of bonding aluminum and its alloys to carbon and to the composite articles so produced.

Light metals, such as aluminum and its alloys, have found wide acceptance where a great strength and rigidity per unit weight is required, such as in the manufacture of aircraft parts, for example, bearings and pump bushings. While aluminum and its alloys provide good bearings surfaces, it is well known that carbon or carbonaceous materials offer superior bearing surfaces. Carbon, however, is quite frangible, but, by bonding the carbon to an aluminum or aluminum alloy member, a strong, light weight, backing member is provided. Thus the useful life of the bearing is increased, since, if a cracking of the carbon occurs, the parts of the carbon bearing will be retained in position and still function as bearing surfaces. Particularly in aircraft installations the bearing need not be replaced immediately, such while the aircraft is in flight, and the parts within the bearings will still function in their proper manner. However, difficulties have been encountered in uniting aluminum and its alloys to carbon since a strong, perfect, bond is rarely attained. Therefore, the principal object of this invention is to provide a process of bonding aluminum and its alloys to carbon to provide a bond of maximum strength.

It is an object of the invention to bond aluminum or its alloys with carbon by means of a dissimilar metal having a melting temperature below that of the materials being bonded.

Another object of this invention is to provide a process of uniting aluminum and its alloys and a material, such as carbon, by the use of a low melting point metal.

A still further object of this invention is to provide an aluminum or an aluminum alloy housing with a carbon bearing surface.

Figure 1:
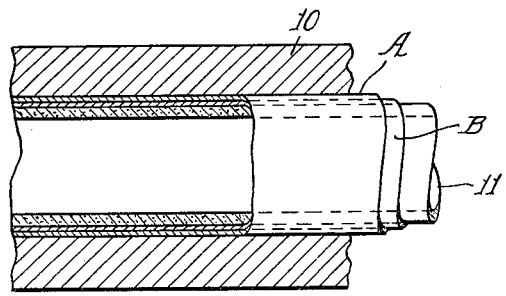
Figure 2:
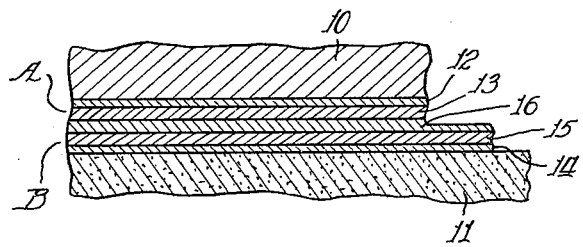

These and other objects and features of this invention will become apparent from the following description when taken with the accompanying drawings, in which:

FIGURE 1 is a partial sectional view of a bearing member and housing formed in accordance with this invention; and FIGURE 2 is a partial sectional view of the bearing of FIGURE 1 illustrating the bond in exaggerated form.

In its preferred form, the invention contemplates the provision of a structure comprising in part a backing member of aluminum or aluminum alloy, and in part a material such as carbon, which parts are united by means of a suitable low melting temperature agent, such as tin, to effectuate a strong permanent union in the nature of a bond. The method in its preferred form broadly comprises the preparing of the aluminum or aluminum alloy body and the preparing of the carbon body and bringing the two bodies together at an elevated temperature to form the bond. The carbon is in the form of a mechanical shape, such as a cylindrical rod, a plate like member, a bar, or other mechanical shape and is such that it is easily handled, as distinguished from finely divided or molecular particles or particles so small that their individual identity is substantially lost. The carbon must therefore be dense, free from voids impregnated oils, impregnated metals such as cadmium or zinc, or foreign matter of any kind that will not conduct current. Also, the carbon must not have the tendency to trap solutions. Impurities or irregularities, as described will result in a poor seal or make the process inoperative. In the preferred form it comprises A.U.C. grade carbon, such as produced by the National Carbon Company.

Reference is now made to the drawings wherein there is illustrated a lined bearing member comprising a housing or sleeve 10 of aluminum or an aluminum alloy composed mainly of aluminum, a bearing liner or bushing 11 of carbon, a flash or strike 12 of copper on the housing, a plating 13 of nickel on the housing, a flash or strike 14 of copper on the carbon, a plating 15 of nickel on the carbon, and a bonding agent 16 of tin, bonding the housing and the carbon liner. The platings are indicated at A and B, respectively, on the housing and carbon, in FIGURE 1. The preferred aluminum alloy is known as 17S, and has a composition of 2.5% copper, 0.5% magnesium, 0.5% manganese and the balance aluminum. Of course, it is to be understood that other aluminum alloys having suitable properties may be used in the process. Also, the carbon may, within the purview of this invention, be bonded to the circumference of the housing, or may be a flat bearing surface bonded to some mechanical shape of aluminum or its alloys.

In making the structure just described, the aluminum or aluminum alloy part is first machined to the approximate shape and is prepared for bonding, as follows:

(1) Degrease to remove cutting oils.
(2) Etch in 10% caustic soda for 10 minutes at room temperature.
(3) Rinse in water at 140° F.
(4) Dip in concentrated nitric acid for 5 to 15 seconds, or until smut is removed.
(5) Rinse in cold water.
(6) Immerse in a caustic zincate bath for 15 to 45 seconds. The work should be uniformly grey. If the work is spotty, repeat steps 4, 5 and 6.
(7) Rinse in cold water.
(8) Copper strike or flash.
(9) Rinse in cold water.
(10) Nickel plate 0.0002 inch minimum in a Watts' type nickel bath with no brighteners.
(11) Rinse in cold water.
(12) Rinse in hot water.
(13) Dry.
(14) Apply a suitable flux to the metal and tin in molten tin at 550° to 700° F.

The carbon member must also be prepared for bonding, as follows:

(1) Degrease to remove any oils.
(2) Rinse in water.
(3) Acid dip in a 1.1 hydrochloric acid bath.
(4) Rinse in water.
(5) Copper strike or flash.
(6) Rinse in cold water.
(7) Nickel plate 0.0002 inch minimum in a Watts' type nickel bath with no brighteners.
(8) Rinse in water.
(9) Dry.
(10) Apply a suitable flux to the plated carbon and tin in molten tin at 550° to 700° F.

As soon as the two parts, i.e., the aluminum part and the carbon part, are tinned, they are brought together under pressure, usually on the order of 2,000 p.s.i. and air cooled. The assembly is then ready for machining to its final dimensions.

With regard to the preparation of the aluminum or aluminum alloy and carbon shapes as set forth above, the copper and nickel plates on the members provide surfaces to which tin will adhere, since aluminum or aluminum alloys or carbon cannot be tinned directly. The copper is flashed onto the parts for good adherence and the nickel is plated thereon to a thickness of at least 0.0002 inch. The usual thickness of the nickel plate is 0.0005 inch. Nickel is employed as the final plating because it tins well and does not go into solution with the tin too rapidly, thus allowing time to heat the members to tinning temperature by immersion in the tin bath. No brighteners are employed in the nickel bath since they tend to make a plated metal brittle.

In tinning a material, it is usual to apply a flux to the parts prior to the tinning and a Du Pont product "Eureka No. 55," a highly active and corrosive acid chloride type has been found satisfactory. However, other fluxes may be employed in the process, and it must be noted that no further flux is used after the parts are tinned; this procedure avoiding the trapping of flux at the interface.

The temperature employed to tin the parts may be in the range of 550° to 700° F. When the tin pot is large, temperatures of 550° to 650° F. may be employed. However, when the tin pot is small, that is, the volume of tin is small, temperatures of 600° to 700° F. are advantageously employed because the parts tend to extract heat from the molten tin very rapidly.

When the parts are assembled, it may be necessary to add additional tin therebetween, and such tin may be melted and flowed between the parts.

Although the bonding layer is referred to as being tin, it will be understood that a composition composed mainly of tin may be employed.

The resultant product is very adaptable for changing temperature conditions. For example, an essentially aluminum cylinder 1⅜ inch outside diameter and ¾ inch inside diameter with a carbon line 1/16 inch thick has been subjected to at least 20 thermal shocks (180° F. to 110° F.) and inspected thereafter. The structure showed no deterioration from the test to which it was subjected.

While the invention has been described within connection with several embodiments thereof, it is to be understood that this by way of illustration and not by way of limitation and the scope of this invention is defined solely by the appended claims which should be construed as broadly as the prior art will permit.

We claim:

1. A composite bonded metal structure comprising consecutively a layer of a metal selected from the group consisting of aluminum and aluminum alloys, a first layer of copper, a first layer of nickel, a layer of tin, a second layer of nickel, a second layer of copper, and a layer of carbon.

2. A composite bonded bearing member comprising a body having a bearing surface, said body comprising a material selected from the group consisting of aluminum and aluminum alloys and said bearing surface comprising carbon, a first layer of copper on said body, a layer of nickel on said copper, a second layer of copper on said carbon, a layer of nickel on said second layer of copper, a layer of tin disposed between said layers of nickel.

References Cited in the file of this patent

UNITED STATES PATENTS

| | | |
|---|---|---|
| 1,314,603 | Mott | Sept. 2, 1919 |
| 2,024,150 | Davignon | Dec. 17, 1935 |
| 2,464,821 | Ludwick et al. | Mar. 22, 1949 |
| 2,746,140 | Belser | May 22, 1956 |
| 2,887,766 | Fike et al. | May 26, 1959 |

FOREIGN PATENTS

| | | |
|---|---|---|
| 397,095 | Great Britain | Jan. 1, 1933 |
| 683,608 | Great Britain | Dec. 3, 1952 |